(12) United States Patent
Schlanger

(10) Patent No.: US 10,630,193 B1
(45) Date of Patent: Apr. 21, 2020

(54) ISOLATED PHASE CONTROL POWER REGULATION CIRCUIT AND SYSTEM

(71) Applicant: EV Enterprises, Palm Springs, CA (US)

(72) Inventor: William Jeffrey Schlanger, Palm Springs, CA (US)

(*) Notice: Subject to any disclaimer, the term of this patent is extended or adjusted under 35 U.S.C. 154(b) by 0 days.

(21) Appl. No.: 16/292,874

(22) Filed: Mar. 5, 2019

(51) Int. Cl.
G05F 1/10 (2006.01)
H02M 7/06 (2006.01)
H02M 1/00 (2006.01)

(52) U.S. Cl.
CPC .............. *H02M 7/066* (2013.01); *H02M 1/00* (2013.01); *H02M 2001/0012* (2013.01)

(58) Field of Classification Search
CPC ........... H05B 33/0815; H05B 33/0845; H05B 37/02; H05B 37/0272; H05B 37/0227; G05F 1/10
See application file for complete search history.

(56) References Cited

U.S. PATENT DOCUMENTS

| | | |
|---|---|---|
| 3,816,794 A | 7/1974 | Snyder |
| 3,894,265 A | 7/1975 | Holmes et al. |
| 4,016,451 A | 4/1977 | Engel |
| 4,197,485 A | 4/1980 | Nuver |
| 4,287,455 A | 9/1981 | Drieu |
| 4,360,784 A | 11/1982 | Bartlett |
| 4,797,599 A | 1/1989 | Ference et al. |
| 4,904,906 A | 2/1990 | Atherton et al. |
| 7,570,031 B2 | 8/2009 | Salvestrini |
| 8,922,133 B2 | 12/2014 | Jausman, Jr. et al. |
| 2007/0109695 A1* | 5/2007 | Newlon .............. H02H 7/04 361/38 |
| 2007/0217237 A1* | 9/2007 | Salvestrini .......... H05B 39/08 363/125 |
| 2010/0270982 A1 | 10/2010 | Hausman, Jr. et al. |
| 2011/0260779 A1* | 10/2011 | Liu .................... H02J 7/0024 327/520 |

* cited by examiner

*Primary Examiner* — Sibin Chen
(74) *Attorney, Agent, or Firm* — Invention To Patent Services; Alex Hobson

(57) ABSTRACT

A phase controlled power regulation circuit is isolated from a line voltage and therefore overcomes some of the safety issues associated with currently available potentiometers. A phase controlled power regulation circuit employs a potentiometer that is electrically isolated from mains power. A transformer regulates the line voltage down to a reduced reference voltage that is used by the power regulation circuit. Any single point failure of a component within the power regulation circuit will not create unsafe condition. This greatly simplifies regulatory approval and opens new applications. Since the potentiometer is operated at low voltage, it may be remotely located from the circuits that handle the power with two conductors of class 2 wiring. Also, the potentiometer need not be of a panel mounted rotary or sliding type. It may be a potentiometer integrated circuit controllable from a microprocessor that enables complex regulation and/or sequencing control.

19 Claims, 1 Drawing Sheet

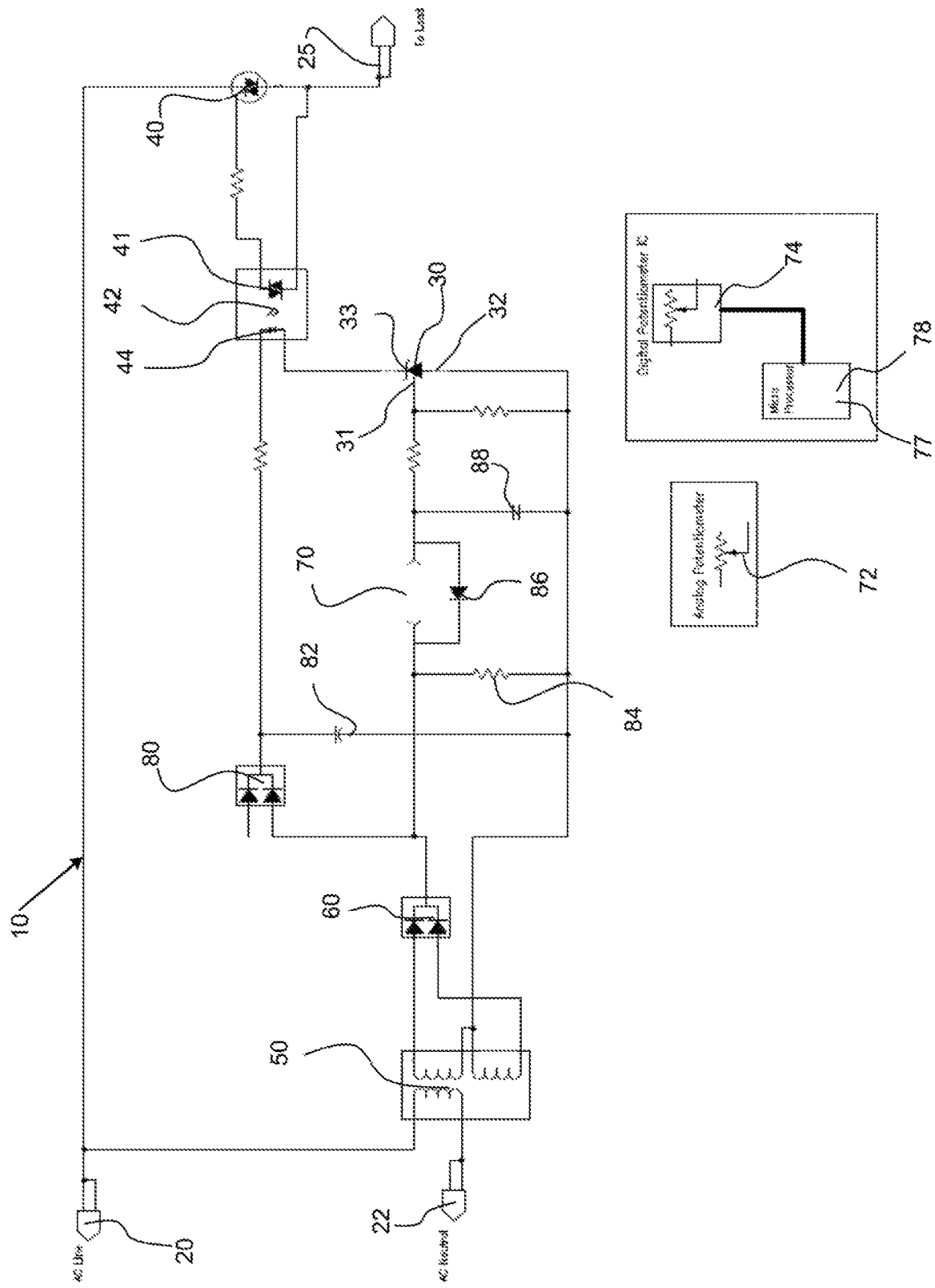

ISOLATED PHASE CONTROL POWER REGULATION CIRCUIT AND SYSTEM

BACKGROUND OF THE INVENTION

Field of the Invention

The present invention relates to a control circuit for regulating power supplied to a mains operated alternating current device. In the exemplary embodiment, a potentiometer which is electrically isolated from hazardous line voltage may be used to provide the regulation set point.

Background

Phase control is a common method to regulate the brightness of a lamp, temperature of a heating element, speed of a motor, or the output of many other devices. Typical phase controls of present art usually employ a potentiometer connected to the mains voltage to set the power output. These circuits can cause an electric shock should the potentiometer become damaged through accident or abuse and connect its metal parts to the mains. Regulatory approval of these circuits is therefore difficult. Also, for this reason, these circuits are not suitable for hazardous or wet locations.

SUMMARY OF THE INVENTION

The invention is directed to a phase controlled power regulation circuit that is isolated from a line voltage and therefore overcomes some of the safety issues associated with the prior art. An exemplary phase controlled power regulation circuit employs a potentiometer that is electrically isolated from mains power. A transformer regulates the line voltage down to a reduced reference voltage that is used by the power regulation circuit. Any single point failure of a component within the power regulation circuit will not create a shock hazard. This greatly simplifies regulatory approval and opens new applications. Since the potentiometer is operated at low voltage, it may be remotely located from the circuits that handle the power with two conductors of class 2 wiring. Also, the potentiometer need not be of a panel mounted rotary or sliding type. It may be a potentiometer integrated circuit controllable from a microprocessor or other digital means. Such, a circuit could be used for complex regulation and/or sequencing systems.

An exemplary phase controlled power regulation circuit is isolated from a line voltage and comprises a transformer that reduces a line voltage to reference voltage to trigger a photo-triac that provides power to a load. The transformer also produces, a steady DC voltage to power the control circuit via a diode and a capacitor. The potentiometer charges a capacitor having an input to a shunt regulator. When the capacitor reaches the reference voltage, the shunt regulator provides power to an optocoupler having a light emitting diode (LED). A photo-triac is activated when the LED illuminates and the gate of the photo-triac is opened to provide power to the load. The optocoupler and photo-triac isolate the circuit from the line voltage and open and close the gate of the photo-triac to provide power over a portion of the alternating currently cycle. The gate of the photo-triac will stay open for the duration of an AC power half cycle.

An exemplary phase controlled power regulation may operate at a reference voltage is a rectified sinewave of about 13V peak in phase with the mains voltage. The DC voltage for operating the phase controlled power regulation circuit may be reduced from the line voltage to about 50% or less of the line voltage, 25% or less of the line voltage, 10% or less of the line voltage and any range between and including the reduced voltages provided.

The phase controlled power regulation circuit enable the potentiometer to be configured remotely from the rest of the circuit. An exemplary potentiometer may be located remotely and coupled to the power regulation circuit with 2 class 2 conductors. An exemplary potentiometer may be a digital potentiometer integrated circuit that is controlled by a microprocessor of a control system.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

FIG. 1 shows a schematic diagram of the exemplary circuit.

Corresponding reference characters indicate corresponding parts throughout the several views of the FIGURES. The FIGURES represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying FIGURES. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Power handling in the circuit, is with a triac 40. Triacs are bidirectional power switches that have a control electrode to turn them on with little power. Once turned on the triac will remain turned on until the end, of the current half cycle of the alternating current. It, therefore needs to be triggered twice each cycle. A photo-triac has a sensor to detect light and when the sensor detects light it turns on the triac.

Transformer 50 and bridge rectifier 60 perform two functions in the circuit: 1) producing a reference voltage used in triggering the photo-triac and 2) providing a steady DC voltage to power the control circuit via diode 80 and capacitor 82. The reference voltage is a rectified sinewave of about 13V peak in phase with the mains voltage. Resistor 84 provides a load on the reference voltage to make sure it goes to zero at the end of every half cycle.

A shunt regulator 30 behaves like a programmable Zener diode. When the reference pin 31 goes to reference voltage, such as 2.5V above the anode, a current can flow from the cathode to the anode, like, a Zener in avalanche mode with 2.5V between the anode and cathode. This feature is used in this circuit to trigger the photo-triac. Note that a shunt regulator may be chosen to have a reference or trigger voltage that is any suitable value. It is desirable that the both the steady state DC voltage and the reference voltage be a safe voltage, or a voltage that is unlikely to cause serious injury, such as less than 35V, preferably less than 25V, more preferably less than 13 volts and even more preferably less, than about 5V and any range between and including the values provided. In addition, the steady state and reference voltages may be some portion of the line voltage, such about 50% of the line voltage or less, about 25% of the line voltage or less, about 10% of the line voltage or less and any range between and including the values provided.

A potentiometer 70 is used to charge a capacitor 88 from the rectified half sinewave. The capacitor voltage is applied to the reference pin 31 on the shunt regulator. When this voltage reaches 2.5V, the shunt regulator 30 conducts and a current flows from the positive supply pin 33 through the LED 44 in optocoupler 42. Diode 86, forces the voltage on capacitor 88 to follow the reference voltage down in the second half of the rectified sinewave thus preparing it to trigger on the next half sinewave. The Resistor Capacitor (RC) time constant of the potentiometer 70 and capacitor 88 can range from 0 to 8 msec. In this way, the shunt regulator 30 can be made to conduct at any time in the half sinewave reference voltage. The earlier in the half sinewave the shunt, regulator conducts, the sooner in the sinewave the triac 40 conducts and the more power is delivered to the load.

When a current flows through the LED 44 in the optocoupler 42, it emits infrared light which causes the photo-triac 41 to conduct. The resulting current flow causes a current to flow into the gate of the triac 40, turning it on and allowing power to flow to the load, through the load power line 25.

Also, shown in FIG. 1 is an analog potentiometer 72 that is configured remotely from the power control circuit and connected by a physical connection, such as electrical wires 76. For example, a remote potentiometer may be coupled by two class 2 conductors. Also shown is a digital potentiometer 74 that may be located remotely from the power control circuit and may be controlled by a controller 77 having a microprocessor 78. A set condition of power and time may be controlled in this manner.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A phase controlled power regulation circuit that is isolated from a line voltage of a mains AC source and comprising:
   a) a transformer that provides a reduced, isolated voltage that is both a source for a reference voltage and a power source for the phase controlled power regulation circuit and reduces the line voltage to said reference voltage for use in the power regulation circuit;
   b) a potentiometer,
   c) a shunt regulator;
   d) a capacitor configured between the potentiometer and an input pin to the shunt regulator;
      wherein when the potentiometer charges the capacitor and when said capacitor reaches said reference voltage, the shunt regulator provides power to an optocoupier;
   e) said optocoupler comprising:
      i) a light emitting diode (LED);
      ii) a photo-triac;
   wherein when power is provided to the LED of the optocoupler to activate the photo-triac the photo-triac activates the gate of the triac to power a load;
   wherein power flows to the load from the mains AC source starting when an applied mains voltage exceeds a reference voltage of the shunt regulator, wherein said applied mains voltage is isolated by the transformer that steps down the voltage and is further reduced by a combination of the potentiometer and a resistor; and
   wherein the phase controlled power regulation circuit is isolated from the the combination of the transformer and optocoupler.

2. The phase controlled power regulation circuit of claim 1, wherein when the photo-tris is turned on, the photo-triac will remain turned on until the end of a current half cycle of the mains AC source.

3. The phase controlled power regulation circuit of claim 1, wherein the reference voltage is a rectified sinewave in phase with a mains voltage.

4. The phase controlled power regulation circuit of claim 1, wherein the reference voltage is no more than 50% of the line voltage.

5. The phase controlled power regulation circuit of claim 1, wherein the reference voltage is no more than 25% of the line voltage.

6. The phase controlled power regulation circuit of claim 1, wherein the voltage is a safe voltage of no more than 35V.

7. The phase controlled power regulation circuit of claim 1, wherein the reference voltage is a safe voltage of no more than 10V.

8. The phase controlled power regulation circuit of claim 1, wherein the potentiometer is operated at the reference voltage and isolated from the line voltage.

9. The phase controlled power regulation circuit of claim 8, wherein the potentiometer is coupled to the power regulation circuit with 2 class 2 conductors.

10. The phase controlled power regulation circuit of claim 9, wherein the digital potentiometer integrated circuit is controlled by a control system.

11. The phase controlled power regulation circuit of claim 9, wherein the controlled control system comprises a microprocessor.

12. The phase controlled power regulation circuit of claim 8, wherein the potentiometer is a digital potentiometer integrated circuit.

13. The phase controlled power regulation circuit of claim 1, wherein the potentiometer is located remotely from the power regulation circuit.

14. A power regulation circuit employing phase control that is isolated from a line voltage of a mains AC source and comprising:
 a) a transformer that provides a reduced, isolated voltage that is both a source for a reference voltage and a power source for the phase controlled power regulation circuit and reduces the line voltage to said reference voltage for use in the power regulation circuit;
 b) a potentiometer;
 c) a shunt regulator;
 d) a capacitor configured between the potentiometer and an input pin to the shunt regulator;
  wherein when the potentiometer charges the capacitor and when said capacitor reaches said reference voltage, the shunt regulator provides power to an optocoupler;
 e) said optocoupler comprising:
  i) a light emitting diode (LED);
  ii) a photo-triac;
 wherein when power is provided to the LED of the optocoupler to activate the photo-triac, the photo-triac activates the gate of the triac to power a load;
 wherein power flows, to the load from the mains AC source starting when an applied mains voltage exceeds a reference voltage of the shunt regulator, wherein said applied mains voltage is isolated by the transformer that steps down the voltage and is further reduced by a combination of the potentiometer and a resistor; and
 wherein the phase controlled power regulation circuit is isolated from the line voltage by the combination of the transformer and optocoupler;
 wherein when the photo-triac is turned on, the photo-triac will remain turned on until the end of a current half cycle of the mains AC source;
 wherein the reference voltage is no more than 25% of the line voltage;
 wherein the potentiometer is operated at the reference voltage and isolated from the line voltage.

15. The power regulation circuit of claim 14, wherein the potentiometer is located remotely from the power regulation circuit.

16. The power regulation circuit of claim 15, wherein the potentiometer is coupled to the power regulation circuit with 2 class 2 conductors.

17. The power regulation circuit of claim 15, wherein the potentiometer is a digital potentiometer integrated circuit.

18. The power regulation circuit of claim 17, wherein the digital potentiometer integrated circuit is controlled by a control system.

19. The power regulation circuit of claim 15, wherein the controlled control system comprises a microprocessor.

\* \* \* \* \*